United States Patent [19]

Suzuki

[11] Patent Number: 5,046,951

[45] Date of Patent: Sep. 10, 1991

[54] WIRING APPARATUS FOR MAKING AN ELECTRICAL CONNECTION BETWEEN A STEERING WHEEL AND A STEERING COLUMN OF A MOTOR VEHICLE

[75] Inventor: Hiroshi Suzuki, Ikeda, Japan

[73] Assignee: Daihatsu Motor Co., Ltd., Ikeda, Japan

[21] Appl. No.: 526,995

[22] Filed: May 22, 1990

[30] Foreign Application Priority Data

Jun. 15, 1989 [JP] Japan .................................. 1-153238

[51] Int. Cl.⁵ .............................................. H01R 35/02
[52] U.S. Cl. ............................................ 439/15; 439/164
[58] Field of Search ...................... 439/15, 164, 13, 16

[56] References Cited

U.S. PATENT DOCUMENTS

| | | | |
|---|---|---|---|
| 3,525,536 | 8/1970 | Pruneski | 280/150 |
| 4,246,482 | 1/1981 | Zupancic | 250/445 T |
| 4,540,223 | 9/1985 | Schmerda et al. | 439/15 |
| 4,836,795 | 6/1989 | Schauer | 439/15 |

FOREIGN PATENT DOCUMENTS

| | | |
|---|---|---|
| 5748173 | 9/1955 | Japan . |
| 61-11575 | 1/1986 | Japan . |
| 64-39169 | 3/1989 | Japan . |
| 2164506A | 3/1986 | United Kingdom . |

Primary Examiner—Gary F. Paumen
Attorney, Agent, or Firm—Oblon, Spivak, McClelland, Maier & Neustadt

[57] ABSTRACT

The present invention is concerned with a wiring apparatus for making an electrical connection between a steering wheel and a steering column for a motor vehicle. According to the wiring apparatus of the present invention, a flexible wiring member is housed in a ring-shaped housing space in first and second cases, relatively rotatable, such that its first and second regions are wound in directions reverse to each other via a folded part as a turning point of such directions and a loosening preventive member is disposed between the regions. For this reason, the current can be supplied stably, the durability of the wiring apparatus is superior, and the wiring apparatus can be miniaturized.

8 Claims, 6 Drawing Sheets

FIG. 4
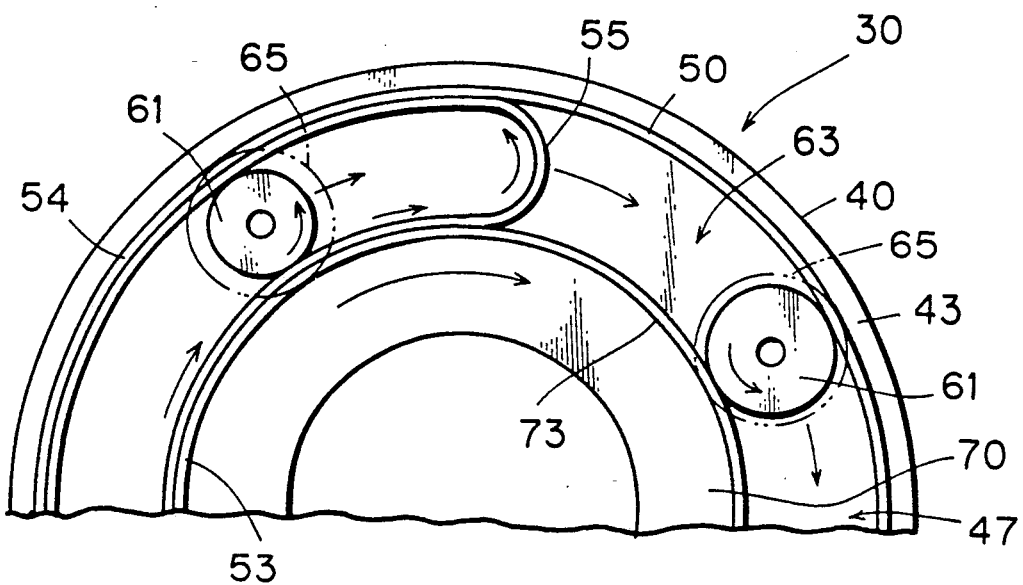
FIG. 9
FIG. 10
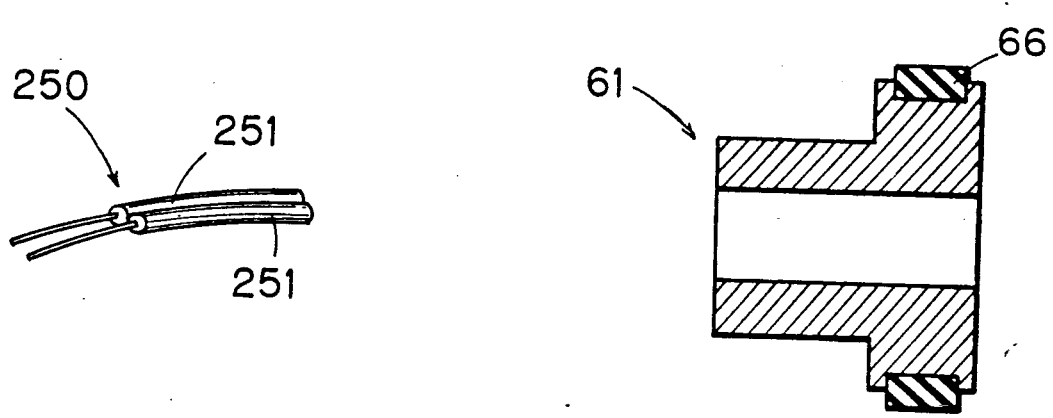

100 # WIRING APPARATUS FOR MAKING AN ELECTRICAL CONNECTION BETWEEN A STEERING WHEEL AND A STEERING COLUMN OF A MOTOR VEHICLE

BACKGROUND OF THE INVENTION

1. Field of the Invention

The present invention relates to a wiring apparatus making an electrical connection between a steering wheel and a steering column of a motor vehicle, which rotatably houses a steering shaft, having the steering wheel mounted to its upper end, and inserted into the steering column.

2. Description of the Related Art

FIG. 11 is a sectional view of a steering apparatus of a motor vehicle into which the conventional wiring apparatus is incorporated. As shown in FIG. 11, a steering column tube 2 fixed to a car body is housed in a steering cover 1, and a turn signal box 3 is mounted to an outer periphery on an upper end of the steering column tube 2. A steering shaft 4 is rotatably supported through a bearing 5 in the steering column tube 2. A steering wheel 6 is fixed to the upper end of the steering shaft 4, whose lower end is inserted into a steering gear box (not shown).

A wiring apparatus 7 is disposed between the steering wheel 6 and the turn signal box 3. The wiring apparatus 7 comprises a metallic contact ring 8 fixed to the steering wheel 6 and a metallic piece 9 fixed to the turn signal box 3. The contact ring 8 is fixed to a back face of the steerinG wheel 6 and the steering shaft 4 is inserted into a hole made in a center of the contact ring 8. On the other hand, the metallic piece 9 has its base end fixed to the turn signal box 3 and its top end contacted with the contact ring 8 by the spring force of the metallic piece 9. Thus, the metallic piece 9 is always in contact with the contact ring 8 without being influenced by rotational operations of the steering wheel 6.

A horn switch 10 is provided in a center of the steering wheel 6. A traveling contact 11 of the horn switch 10 is electrically connected to the contact ring 8 by way of a lead wire 13, and a lead wire 14 connected to a fixed contact 12 of the horn switch 10 is led into the steering shaft 4. A lead wire 15 connected to the metallic piece 9 and the lead wire 14 are connected with a battery, a horn and the like, respectively, to constitute a horn circuit.

In the steering apparatus, when a driver pushes the horn switch 10 so that both the contacts 11 and 12 are closed, the horn circuit is correspondingly closed. As a result, a current flows in the lead wire 15, the metallic piece 9, the contact ring 8, the lead wire 13, the traveling contact 11, the fixed contact 12 and the lead wire 14, thereby sounding a horn.

In the conventional wiring apparatus 7, however, since a connection between the metallic piece 9 and the contact ring 8 will permit a flow of the current, if any dust comes between the contact ring 8 and the metallic piece 9, an imperfect contact results. For this reason, there is a difficulty in obtaining function of stably supplying the current.

As a similar wiring apparatus for making an electrical wiring between the steering wheel and the steering column, a mechanism as mentioned in Japanese Utility Model Laying Open Gazette 57-48173 is known. In that case, the similar difficulty is also incurred.

FIG. 12 is a schematically sectional view of another conventional wiring apparatus 20 as disclosed in Japanese Utility Model Laying Open Gazette 63-137069. As shown in FIG. 12, the wiring apparatus 20, connecting an inner-side case 21 and an outer-side case 22 to each other such that these two cases 21 and 22 can be relatively rotated, has a ring-shaped housing space 23 surrounded by both the cases 21 and 22. A flexible wire of metal 24 is housed in the housing space 23. The flexible wire 24, spirally wound, has an outer-side end fixed to the outer-side case 22 and an inner-side end fixed to the inner-side case 21. The outer-side case 22 is fixed to a steering column, while the inner-side case 21 is fixed to a steering wheel. Thus, the flexible wire 24 permits the electrical connection between the steering wheel and the steering column to be effected. In the wiring apparatus 20 of such a construction, for example, if operations of the steering wheel cause the inner-side case 21 to be rotated in a clockwise direction of FIG. 12, the flexible wire 24 is wound to decrease its diametrical dimension, whereas if the inner-side case 21 is rotated reversively in a counterclockwise direction of FIG. 12, the diametrical dimension of the flexible wire 24 is increased to release its winding. Thus, the supply of the current between the steering column and the steering wheel is ensured by permitting a rotation of the steering wheel while adjusting the wound state of the flexible wire 24.

In the wiring apparatus 20, since the electrical connection between the steering column and the steering wheel is made directly by the flexible wire 24 instead of a contact touch construction as shown by the conventional example of FIG. 11, the stable supply of the current can be assured. However, since the rotation of the steering wheel is permitted by an adjustment of winding amount of the flexible wire 24, which is wound in one direction only, the diametrical dimension of the flexible wire 24 changes in response to the rotational operations of the steering wheel. As a result, it is necessary to design a dimension of the outer-side case 22 on the basis of the maximum diametrical dimension of the flexible wire 24, and therefore it may give rise to size problems.

In addition, whenever a repetitiOn of the winding action and the releasing actiOn of the wound state of the flexible wire 24 is caused by the rotational operations of the steering wheel, a stress concentrates in bent parts 24a and 24b in the vicinity of both the ends of the flexible wire 24. For this reason, the wiring apparatus 20 has a problem of deteriorating durability due to an accumulation of the fatigue in the bent parts 24a and 24b.

SUMMARY OF THE INVENTION

The present invention is concerned with a wiring apparatus for making an electrical contact between a steering wheel and a steering column of a motor vehicle which houses rotatably a steering shaft having the steering wheel mounted to its upper end and inserted into the steering column.

The wiring apparatus of the present invention includes: a first case, fixed to the steering column, wherein the steering shaft extends into its central part; a second case, fixed to the steering wheel, wherein the steering shaft extends into its central part, a ring-shaped housing space being formed between the first case and the second case; a flexible wiring member which has its one end fixed to the first case, its another opposite end fixed to the second case, a first region, extended from the one end which is wound in one direction along a circumferential direction of the housing space, a second region, extended from the another opposite end which is wound in another direction along a circumferential direction of the housing space, and a folded part making a connection between the first region and the second region, the flexible wiring member being housed in the housing space; and a loosening preventive member having at least one roller disposed between the first region and the second region of the flexible wiring member such that a peripheral face of the roller is in contact with both the regions, the roller being caused to be moved along &he circumferential direction in the housing space by a relative rotation of the first and second cases.

Therefore, a principal object of the present invention is to provide a wiring apparatus capable of obtaining a stable supply of a current.

A further object of the present invention is to provide a wiring apparatus which is superior in durability.

A still further object of the present invention is to provide a wiring apparatus capable of being miniaturized.

According to the wiring apparatus of the present invention an electrical contact between the steering column and the steering wheel is made directly by the flexible wiring member, thereby enabling a stable supply of the current.

The flexible wiring member is housed in the housing space surrounded by the first and second cases so as to reverse the winding directions of the first and second regions through the folded part, and therefore it makes a size of the housing space smaller to miniaturize the wiring apparatus.

The roller is disposed between the first and second regions whose winding directions are opposite to each other, and therefore the roller prevents the wound state in the first and second regions from being loosened in response to the rotational operations of the steering wheel. For this reason, a smooth action of the wiring apparatus can be obtained, and it is possible to prevent the stress from concentrating in a specific part of the flexible wiring member to improve the durability of the wiring apparatus.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a plan view of a principal part for describing an action of the wiring apparatus;

FIG. 9 is a perspective view of.a variant example of the flexible wiring member;

FIG. 10 is a sectional view of a variant example of the roller;

DESCRIPTION OF THE PREFERRED EMBODIMENTS

Figure 1:
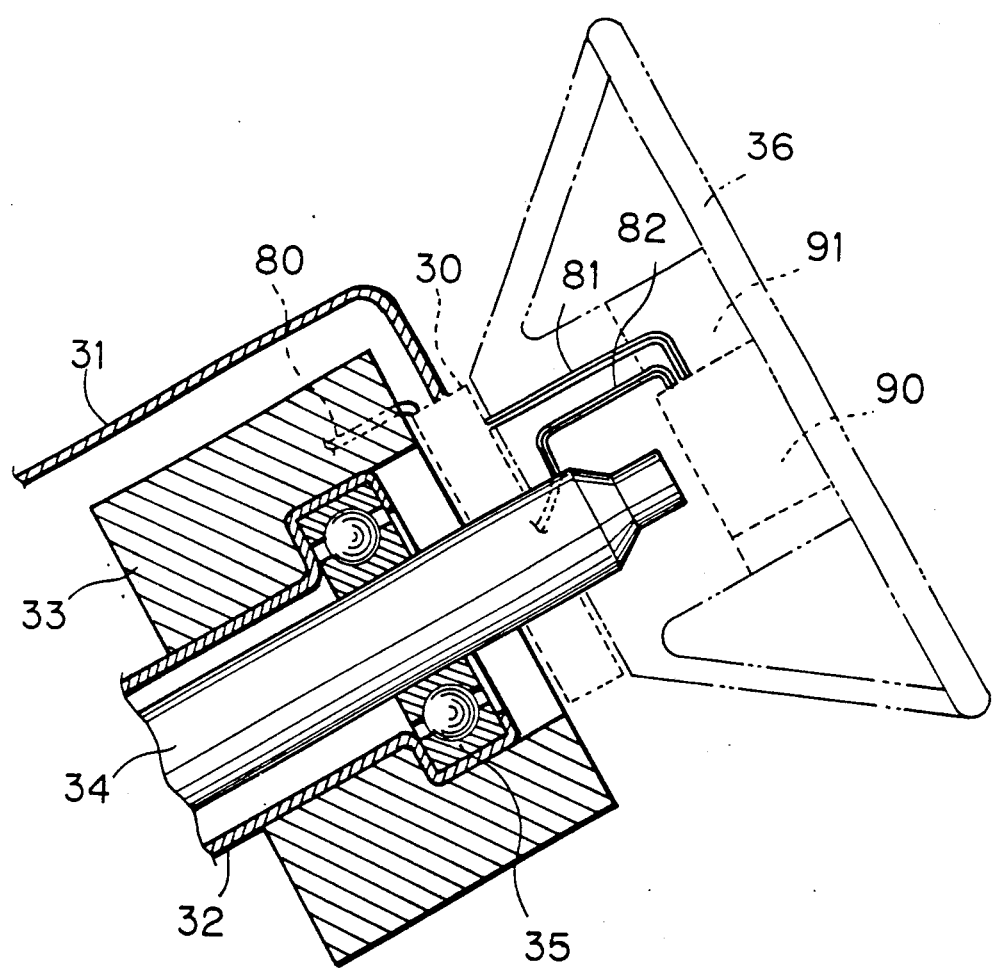
FIG. 1 is a sectional view of a steering apparatus for a motor vehicle into which a wiring apparatus of a first embodiment according to the present inventiOn is incorporated.

FIG. 1 is a schematic sectional view of a steering apparatus for a motor vehicle into which a wiring apparatus 30 of a first embodiment according to the present invention is incorporated.

As shown in FIG. 1, a steering column tube 32 fixed to a car body is housed in a steering cover 31, and a turn signal box 3 is mounted to an outer periphery on an upper end of the steering column tube 32. A steering shaft 34 is rotatably supported through a bearing 35 in the steering column tube 32, and a steering wheel 36 is fixed to an upper end of the steering shaft 34. A wiring apparatus 30 is disposed between &he turn signal box 33 and the steering wheel 36.

Figure 2:
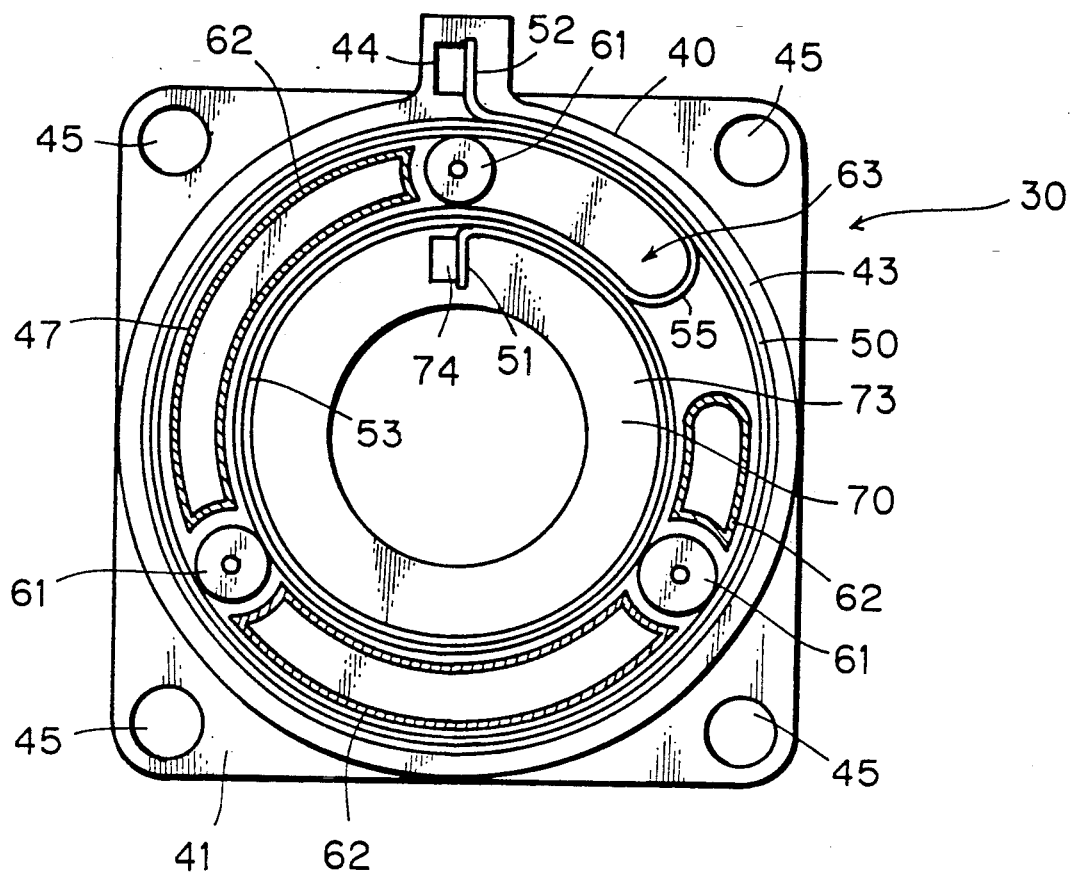
FIG. 2 is a sectional view of the wiring apparatus of the first embodiment.
Figure 3:
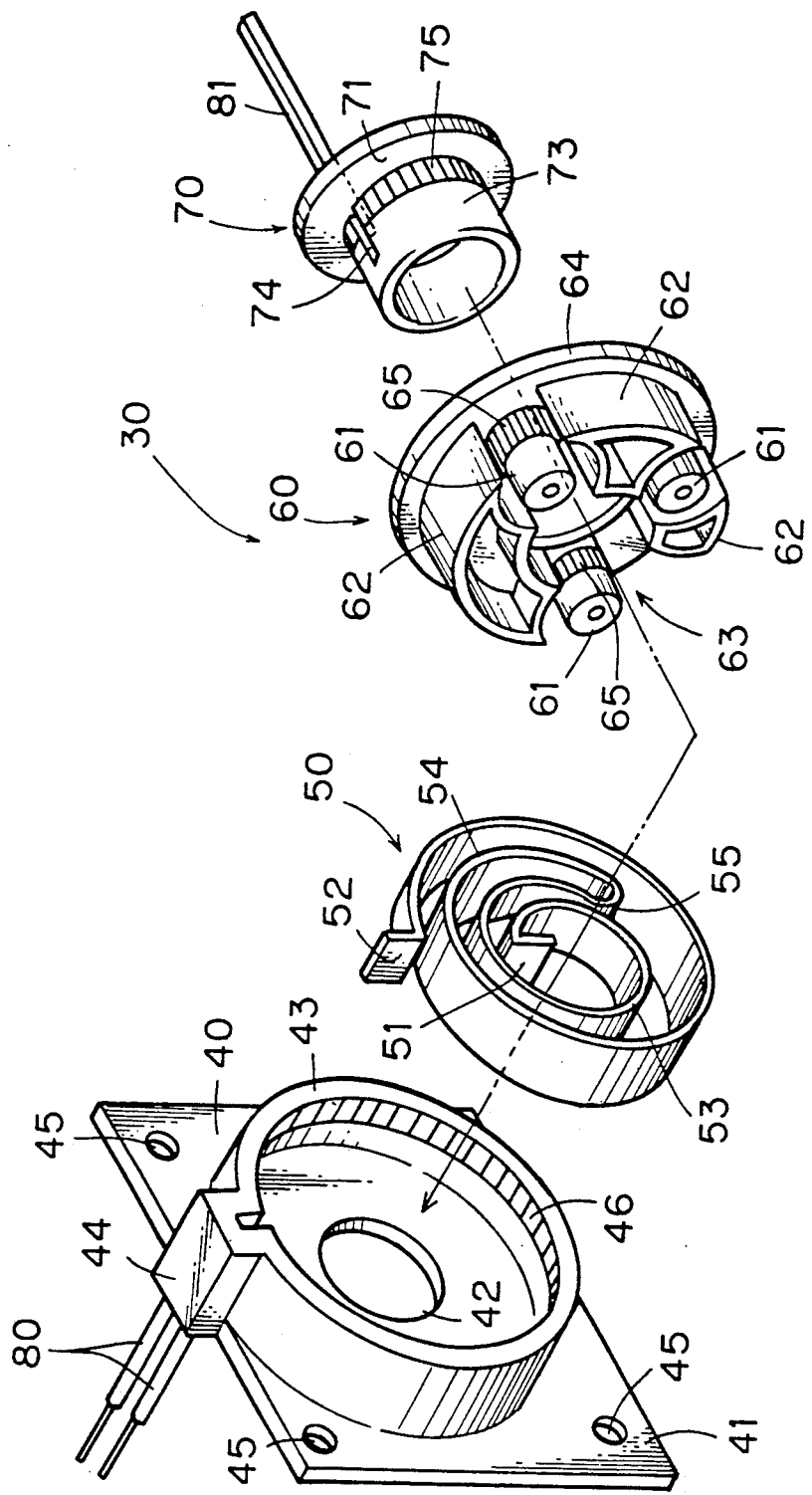
FIG. 3 is an exploded perspective view of the wiring apparatus of FIG. 2.

FIG. 2 is a sectional view of the wiring apparatus 30. FIG. 3 is an exploded perspective view of the wiring apparatus 30. FIG. 4 is a plan view for describing an action of the wiring apparatus 30. As shown in FIGS. 2 to 4, the wiring apparatus 30 includes a first case 40, a flexible wiring member 50, a loosening preventive member 60, and a second case 70.

The first case 40 includes a square base plate 41 and a cylindrical part 43 provided on one face of the base plate 41. A hole 42 is provided in a central part of the base plate 41. The hole 42 is formed for inserting the steering shaft 34 thereinto such that an axial direction of the steering shaft 34 is in line with an axial direction of the cylindrical part 43. A plurality of holes 45 through which fixing screws are inserted are provided in corners, respectively of the base plate 41. A connector part 44 is formed on an outer periphery of the cylindrical part 43, while a circumferential gear part 46 is formed on a top end side of an inner peripheral face of the cylindrical part 43.

The second case 70 includes a cylindrical part 73 and a ring shaped flange 71 provided on one end side of the cylindrical part 73. An outer diameter of the cylindrical part 73 is formed to be smaller than an inner diameter of the cylindrical part 43 of the first case 40. A connector part 74 is formed on an outer peripheral face of the cylindrical part 73, and a gear part 75 is formed along a circumferential direction on one end side of the outer peripheral face of the cylindrical part 73.

The second case 70 is rotatably disposed to be housed in the first case 40 such that an axial direction of the cylindrical part 73 is in line with the axial direction of the cylindrical part 43 and the other end side of the cylindrical part 73 is aligned with an opening edge of the hole 42, whereby a ring-shaped housing space 47 is formed between the inner peripheral face of the cylindrical part 43 and the outer peripheral face of the cylindrical part 73 while being surrounded by both the cases 40 and 70. For this reason, a center of curvature of the housing space 47 is identical to each of those of both the cylindrical parts 43 and 73.

Figure 5:
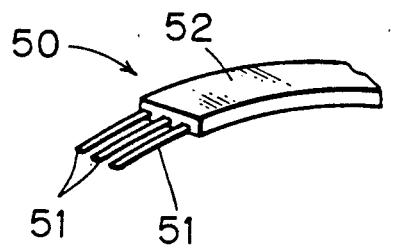
FIG. 5 is a partially cut-away perspective view of a flexible wiring member which is incorporated into the wiring apparatus.

As shown in FIG. 5, the flexible wiring member 50 having a strip-shape has a plurality of conductive wires 51, electrically insulated from one another, which are disposed in parallel with one another and are coated with a resin 52. The flexible wiring member 50 is to be housed in the housing space 47 in the following manner: After one end 51 of the flexible wiring member 50 is connected to the connector part 74 of the second case 70, the flexible wiring member 50 is wound in a clockwise direction of FIG. 2 along the outer periphery of the cylindrical part 73, turned up by 180° at an approximate middle position thereof, and, after a remaining region of the flexible wiring member 50 is wound in a counterclockwise direction of FIG. 2 along the inner periphery of the cylindrical part 43, another opposite end 52 thereof is connected to the connector part 44 of the first case 40. Thus, a first region 54 is wound along the inner periphery of the cylindrical part 43, a second region 53 is wound along the outer periphery of the cylindrical part 73, and a folded part 55 makes a connection between the first region 54 and the second region 53.

Figure 6:
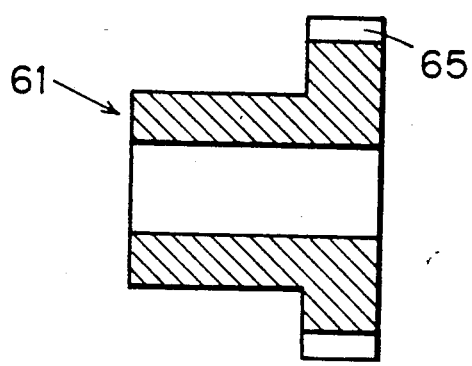
FIG. 6 is a sectional view of a roller which is applied to the wiring apparatus.

As shown in FIG. 3, the loosening preventive member 60 has three units of rollers 61 mounted rotatably to one face side of a ring-shaped base plate 64. Each of the rollers 61 is disposed along a circumferential direction of the ring-shaped base plate 64 at equal intervals. Each of the rollers 61 is also set to be equidistant from a central position of the ring-shaped base plate 64. As shown in a sectional view of FIG. 6, a gear part 65, engageable with the afore mentioned gear parts 46 and 75 respectively, is formed along an outer peripheral face of a base end side of each roller 61. Three units of spacers 62, disposed between the rollers 61, are formed on the one face side of the base plate 64. One of the spacers 62 is finished so as to be smaller in size and a space 63 for housing the folded part 55 of the flexible wiring member 50 is formed between the small spacer 63 and one of the afore-mentioned rollers 61.

The loosening preventive member 60 is disposed between both the cases 40 and 70 in the following manner: The cylindrical part 73 of the second case 70 is rotatably inserted into a central hole in the base plate 64 and the gear part 75 is set to be in mesh with each of the gear parts 65 of the rollers 61. Under such a state, the second case 70 is rotatably housed in the first case 40 together with the loosening preventive member 60 and the flexible wiring member 50, and each of the gear parts 65 of the rollers 61 is set to be in mesh with the gear part 46 of the first case 40. In that case, an outer peripheral part of the base plate 64 of the lOOsening preventive member 60 is disposed to be correspondingly aligned to a top end part of the cylindrical part 43 of the first case 40. Furthermore, the rollers 61 and the spacers 62 are disposed between the first region 54 and the second region 53 of the flexible wiring member 50 so that the outer peripheral faces of the rollers 61 are in slight contact with the first and second regions 54 and 53 respectively. The folded part 55 of the flexible wiring member 50 is housed in the space 63 in the loosening preventive member 60.

The wiring apparatus 30 of such a construction is incorporated into the steering apparatus in the following manner: After the steering shaft 34 is inserted into the hole 42 of the first case 40 and the cylindrical part 73 of the second case 70 in the wiring apparatus 30, the first case 40 is fixed to the turn signal box 33 by screws passed into the mounting holes 45, while the second case 70 is fixed to a back face side of the steering wheel 36. Thus, each of the cylindrical parts 43 and 73 and the rollers 61 is aligned with the steering shaft 34, while the first region 54 and the second region 53 of the flexible wiring member 50 are disposed to face to each other along a diametrical direction of the steering shaft 34.

Next, a plurality of lead wires 80 drawn out of the inside of the turn signal box 33 are connected to the connector part 44 of the first case 40, while a plurality of lead wires 81 arranged in the steering wheel 36 are connected to the connector part 74 of the second case 70, whereby the lead wires 80 and the lead wires 81 are electrically connected through the flexible wiring member 50 to each other.

On the other hand, an inside of the steering wheel 36 is equipped with a operational part 90 including a horn switch, an automatic control button, an audio volume switch and the like and an actuation part 91 including an air bag inflator and the like. A plurality of lead wires 81 are connected to the operational part 90 and actuation part 91. In addition, a plurality of lead wires 82 drawn out of the operational part 90 and the actuation part 91 are inserted into the steering shaft 34 to connect with various kinds of electrical appliances (not shown).

In the steering apparatus, for example, when the steering wheel 36 is rotated to turn to right, first the second case 70 is rotated in a clockwise direction as shown by arrows of FIG. 4 together with the steering wheel 36, whereby the second region 53 of the flexible wiring member 50, wound around the outer peripheral face of the cylindrical part 73, is successively released from its wound position in vicinity of the folded part 55, while the first region 54 is wound around the inner peripheral face of the cylindrical part 43 by an amount of releasing its afore-mentioned wound state. Thus, the folded part 55 of the flexible wiring member 50 is moved in the clockwise direction of FIG. 4 along the circumferential direction in the housing space 47 at a rotational speed less than ½ of that of the second case 70. On the other hand, since the rollers 61 of the loosening preventive member 60 have their gear parts 65 engaged with the gear parts 46 and 75 of both the oases 10 and 70 respectively, the rollers 6 are moved along the circumferential direction in the housing space 47 in a state that the rollers 61 are in contact with the first region 54 and the second region 53 respectively. Namely, the rollers 61, being rotated about their own axes in a counter-clockwise direction, are moved in the clockwise direction of FIG. 4 along the circumferential direction in the housing space 47, thereby maintaining a distance between the rollers 61 and the folded part 55 to be always constant. For this reason, the loosening preventive member 60 is also rotated in the clockwise direction of FIG. 4 in correspondence with a movement of the folded part 55.

Conversely, when the steering wheel 36 is rotated to turn to the left, an action reverse to the aforementioned action will be performed. Namely, as shown by directions reversive to those pointed by the arrows of FIG. 4, the second case 70 is rotated in a counterclockwise direction, whereby the first region 54 of the flexible wiring member 50, wound around the inner peripheral face of the cylindrical part 43, is successively released its wound state from its wound position in vicinity of the folded part 55, while the second region 53 is wound around the outer peripheral face of the cylindrical part 73 by an amount of release of its afore-mentioned wound state. Thus, the folded part 55 is moved in the counterclockwise directiOn of FIG. 4 along the circumferential direction in the housing space 47 at the rotational speed less than ½ of that of the second case 70, while the loosening preventive member 60 is also rotated in the counterclockwise direction in correspondence with a movement of the folded part 55.

Figure 11:
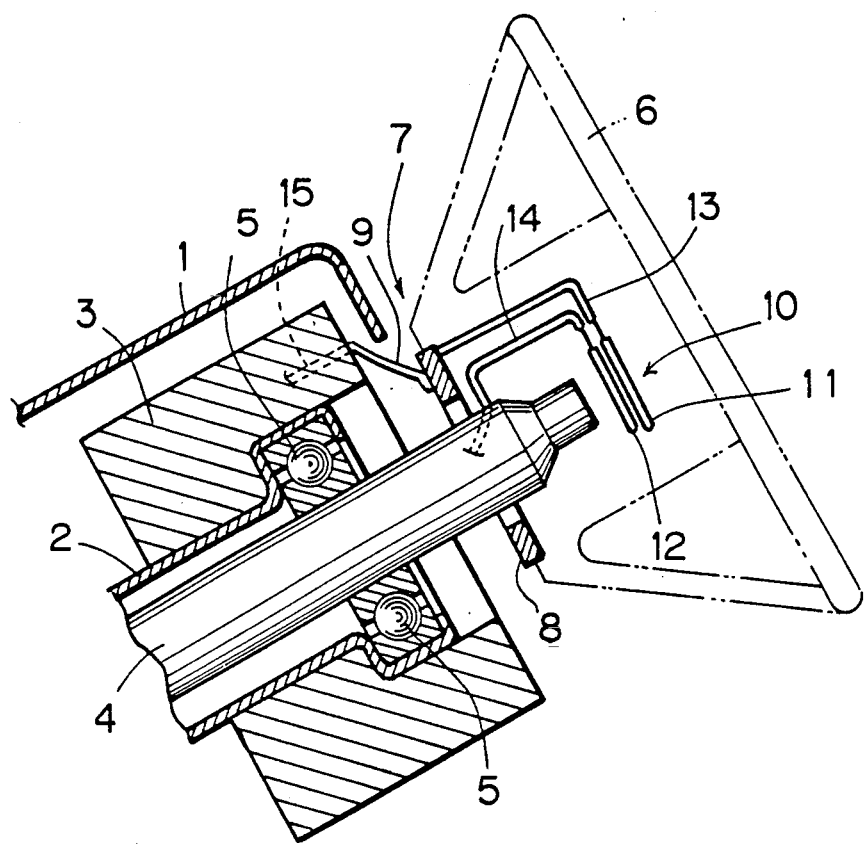
FIG. 11 is a sectional view of a steering apparatus for motor vehicle into which a conventional wiring apparatus is incorporated.

The steering apparatus 30 does not adopt such a contact touch structure as found in the conventional example of FIG. 11, but makes a direct electrical contact between the lead wires 80 fixed to the side of the steering column and the lead wires 81 fixed to the steering wheel 36 through the flexible wiring member 50, so it is possible to acquire the function of supplying stably the current.

Figure 12:
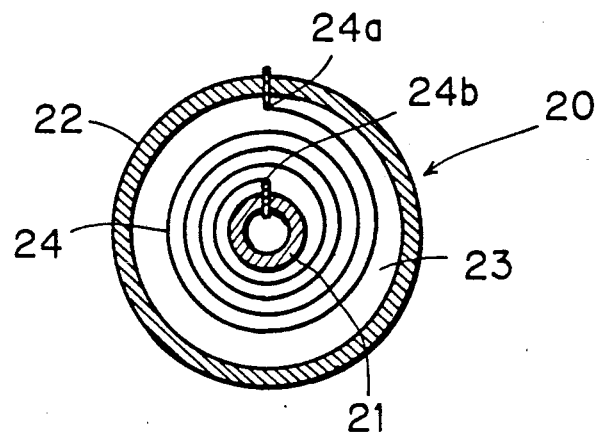
FIG. 12 is a schematic sectional view of another conventional wiring apparatus.

A rotational operation of the steering wheel 36 will release the wound state of the flexible wiring member 50 being wound around the one cylindrical part 43 or 73, whereas such an operatiOn will also permit the winding to be made around another alternative cylindrical part 73 or 43 by an amount equal to that of releasing the afore mentioned wound state, whereby, whichever rotational position the steering wheel 36 takes, the flexible wiring member 50 comes to be always wound around either of the cylindrical parts 43 and 73 with the exception of the folded part 55. For this reason, the diametrical size of the cylindrical part 43 can be made smaller so that it is also possible to miniaturize the wiring apparatus 30 In addition to that, the rotation of &he steering wheel 36 is permitted by moving the folded part 55 of the flexible wiring member 50 along the circumferential direction of the housing space 47, so that a stress taking place at the rotation of the steering wheel 36 is dispersed throughout the flexible wiring member 50. For this reason, the steering apparatus 30 becomes superior in durability without incurring the phenomenon in which, like the conventional wiring apparatus 20 whose example is shown in FIG. 12, the stress is concentrated in the bent parts 24a and 24b of the narrow strip of metal 24.

Since the first region 54 and the second region 53 of the flexible wiring member 50 are pushed by the rollers 61 toward the cylindrical parts 43 and 73 along the diametrical direction respectively, it is assured to prevent the wound state in the first region 54 and the second region 53 from being loosened with the rotation of the second case 70. Furthermore, the spacers 62 provided between the rollers 61 also act as a roll for preventing the wound state in the flexible wiring member 50 from being loosened. It may be acceptable to omit the spacers 62 because they are not always necessary.

Furthermore, since the gear parts 65 of the rollers 61 are in mesh with the gear parts 46 and 75 of both the cases 40 and 70 respectively, slip does not take place between the rollers 61 and both the regions 53 and 54 of the flexible wiring member 50 when the rollers 61 are moved along the circumferential direction in the housing space 47. As a result, it is possible to maintain the distance between the rollers 61 and the folded part 55 to be always constant, and a smooth action of the wiring apparatus 30 can be obtained.

Finally, as shown in FIG. 5, since the flexible wiring member 50 comprises a plurality of conductive wires 51 being coated by the resin 52, it is possible to construct a plurality of separate circuit by using only the one wiring apparatus 30.

Figure 7:
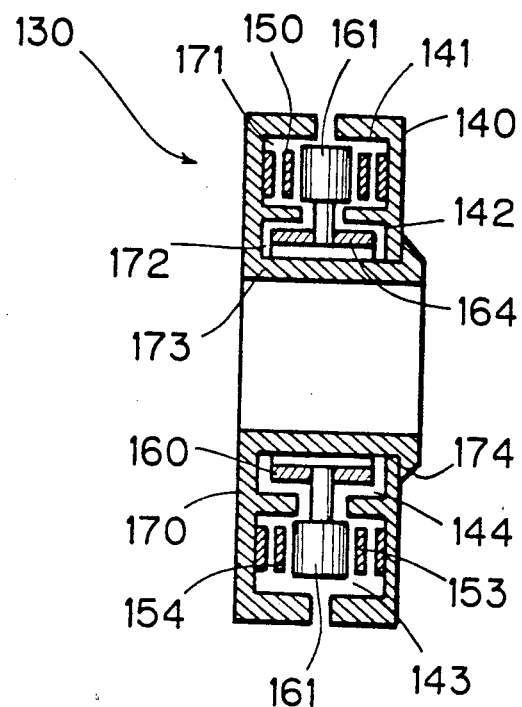
FIG. 7 is a sectional view of a wiring apparatus of a second embodiment according to the present inventiOn.
Figure 8:
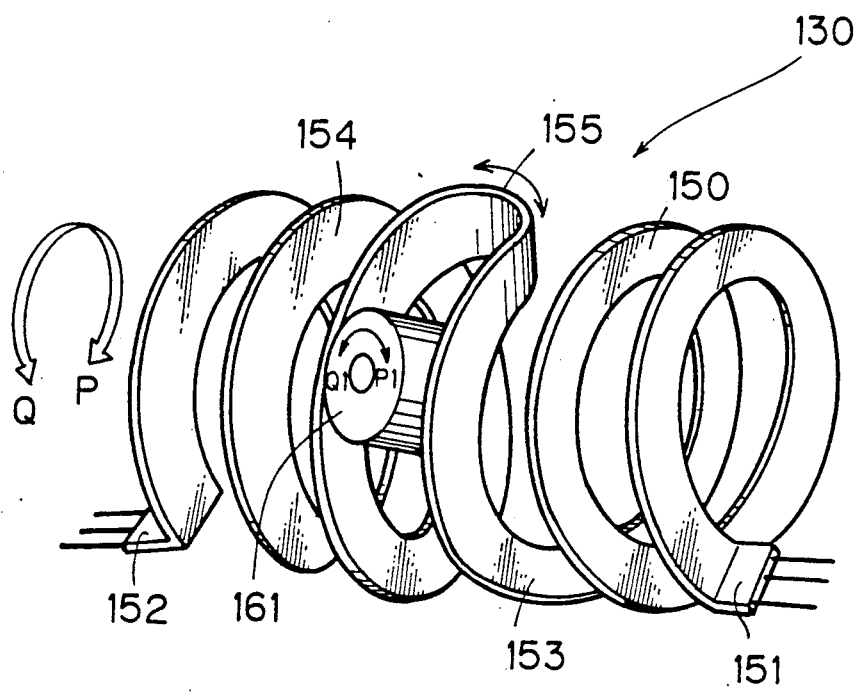
FIG. 8 is a perspective view for describing the construction of the wiring apparatus.

FIG. 7 is a sectional view of a wiring apparatus 130 of a second embodiment according to the present invention. FIG. 8 is a perspective view for describing a construction of the wiring apparatus 130. As shown in FIGS. 7 and 8, the wiring apparatus 130 includes a first case 140, a second case 170, a flexible wiring member 150 and a loosening preventive member 160.

The first case 140 has a ring-shaped outer concave part 141 and a ring-shaped inner concave part 142 formed concentrically on its one face side.

The second case 170 has a ring-shaped outer concave part 171 and a ring-shaped inner concave part 172 formed on its one opposite face side corresponding to the outer concave part 141 and the inner concave part 142 of the first case 140 respectively. Furthermore, the second case 170 has a cylindrical part 173 provided on its center and a hook part 174 is formed around an outer periphery of the cylindrical part 173. When the cylindrical part 173 is inserted into a central hole of the first case 140 and the hook part 174 is held around a peripheral edge of the central hole, the first case 140 is connected rotatably to the cylindrical part 173 of the second case 170. Thus, a ring shaped outer housing space 143 is formed by the outer concave part 141 and the outer concave part 171, while a ring-shaped inner housing space 144 is formed by the inner concave part 142 and the inner concave part 174. The centers of curvature of both housing spaces 143 and 144 are in line with an axial center of the cylindrical part 173.

The flexible wiring member 150 is housed in the outer housing space 143 in the following manner: After one end 151 of the flexible wiring member 150 is fixed to the first case 140, the flexible wiring member 150 is spirally wound along an arrow direction P of FIG. 8, being turned up at a folded part 155, and further spiral winding thereof is made in an arrow direction Q reverse to the arrow direction p, another opposite end 152 thereof being fixed to the second case 170. Thus, a first region 153 is wound in the arrow direction P in the outer concave part 141 of the first case 40, a second region 154 is wound in the arrow direction Q in the outer concave part 171 of the second case 170, and the folded part 155 makes a connection between the first and second regions 153 and 154.

The loosening preventive member 160 includes a ring-shaped base plate 164 which is rotatably housed along a circumferential direction in the inner housing space 144. A plurality of rollers 161 is rotatably mounted to an outer periphery of the base plate 164 such that each roller axis is along the diametrical direction of the base plate 164. Each of rollers 161 is housed in the outer housing space 143 in such a manner that each of rollers 161 is disposed between the first region 153 and the second region 154 of the flexible wiring member 150. In that case, the outer peripheral faces of the rollers 161 are in contact with the first region 153 and the second region 154.

In order to equip the steering apparatus with the wiring apparatus 130, under a state where the steering shaft 34 (see FIG. 1) is inserted into the cylindrical part 173, the first case 140 is fixed to the turn signal box 33, while the second case 170 is fixed to the steering wheel 36. Thus, the axial directions of the rollers 161 come in line with the diametrical direction of the steering shaft 34 and the first region 153 and the second region 154 of the flexible wiring member 150 are disposed to face to each other along the axial direction of the steering shaft 34. Thereafter, the lead wires 80 are set to be in an electrical contact with the one end 151 of the flexible wiring member 150, while the lead wires 81 are also set to be in a electrical contact with another opposite end 152 thereof.

In the wiring apparatus 130, when the second case 170 is rotated in the arrow direction P of FIG. 8 in response to a rotation of the steering wheel 36, the second region 154 of the flexible wiring member 150, located at the side of the second case 170, is successively released from its winding position in the vicinity of the folded part 155, while the first region 153 is wound up toward the first case 140 by an amount of releasing of the afore-mentioned wound state. Thus, the folded par& 155 is moved in the arrow direction P along the circumferential direction in the outer housing space 143 at a half speed of a rotational speed of the first case 170. On the other hand, the rollers 161 of the loosening preventive member 160 are caused to be rotated by themselves in an arrow direction P1 by a relative displacement of the first region 153 and the second region 154 while being revolved in an arrow direction P along the circumferential direction of the outer housing space 143 in correspondence with a movement of the folded part 155.

Reversively, when the second case 170 is rotated in the arrow direction Q, the flexible wiring member 150 located in the first case 140 is successively wound up toward the second case 170 and &he folded part 155 is moved in the arrow direction in the outer housing space 143, concurrently each of rollers 161 being rotated by themselves in an arrow direction Q1, while being revolved in the arrow direction Q.

Such a wiring apparatus 130 can also attain an effect similar to that attained by the afore-mentioned first embodiment.

Although the first embodiment and the second embodiment adapt the flexible wiring members 50 and 150 in which the conductive wires 51 are coated by the resin 52, the flexible wiring member 50 or 150 is not always limited to that. As shown in FIG. 9, for example, it may be also acceptable to use a flexible wiring member 250 being formed by connecting two units of flexible cables 251 which are disposed in parallel with each other.

In the first embodiment, although the gear parts 46, 65, and 75 are provided to prevent any slip from taking place between the rollers 61 and the flexible wiring member 50, other means of preventing such a slip may be also adopted. As shown in FIG. 10, for example, an elastic ring 66 of rubber may be mounted around the outer periphery on the base end side of the roller 61 and the outer peripheral face of elastic rings 66 may be pressed to be in contact with the outer peripheral face of the cylindrical part 73 and the inner peripheral face of the cylindrical part 43 (See FIGS. 2 and 4).

The number of the rollers 61 and 161 which are used in the afore-mentioned embodiments is not always specifically limited. Furthermore, it is not always needed that the roller 60 or 161 is connected to each other by the base plate 64 or 164.

Although the present invention has been described and illustrated in detail, it is clearly understood that the same is by way of illustration and example only and is not to be taken by way of limitation. The spirit and scope of the present invention should be limited only by the terms of the appended claims.

What is claimed is:

1. A wiring apparatus for making an electrical connection between a steering wheel and a steering column for a motor vehicle having a steering shaft, which mounts said steering wheel to its upper end, said steering shaft being housed rotatably in said steering column, said wiring apparatus including:

a first case fixed to said steering column, wherein said steering shaft extends into a central part of said first case;

a second case fixed to said steering wheel, wherein said steering shaft extends into a central part of said second case, a ring-shaped housing space being formed between said first case and said second case;

a flexible wiring member having one end fixed to said first case and another opposite end fixed to said second case, said wiring member including a first region extending from said one end, said first region being wound in one circumferential direction in said housing space, said wiring member including a second region extending from said another opposite end, said second region being wound in another opposite circumferential direction in said housing space, said wiring member including a folded part making a connection between said first region and said second region, said flexible wiring member being housed in said housing space;

a loosening preventive member having at least one roller being disposed between said first region and said second region of said flexible wiring member; and means independent of said flexible wiring member for driving said roller circumferentially in said housing space by a relative rotation of said first and second cases.

2. A wiring apparatus of claim 1, wherein an axial direction of said roller is parallel to an axial direction of said steering shaft and said first region and said second region of said flexible wiring member are disposed to face to along a diametrical direction of said steering shaft.

3. A wiring apparatus of claim 2, wherein said loosening preventive member includes a ring-shaped base plate housed in said housing space, through which said steering shaft is inserted, and wherein said roller is mounted to said base plate.

4. A wiring apparatus of claim 3, wherein said loosening preventive member has a plurality of rollers and said rollers are disposed along a circumferential direction said base plate at least intervals.

5. A wiring apparatus of claim 4, wherein said loosening preventive member further includes spacers fixed to said base plate so as to be located between said first region and said second region.

6. A wiring apparatus of claim 2, wherein said first case further includes a first cylindrical part whose axis is parallel to an axial direction of said steering shaft and a first gear part being formed circumferentially along an inner peripheral face of said first cylindrical part;

said second case further includes a second cylindrical part, whose axis is parallel to the axis of said steering shaft and whose outer diameter is smaller than an inner diameter of said first cylindrical part, and a second gear part being formed circumferentially along an outer peripheral face of said second cylindrical part; and said roller further includes a third gear part being formed circumferentially along an outer peripheral face of said roller, said third gear part being meshed with said first and second gear parts respectively.

7. A wiring apparatus of claim 2, wherein said first case further includes a first cylindrical part whose axis is parallel to an axis of said steering shaft;

said second case further includes a second cylindrical part whose axis is parallel to the axis of said steering shaft and whose outer diameter is smaller than an inner diameter of said first cylindrical part; and said roller further includes an elastic ring being formed circumferentially along an outer peripheral face of said roller, said elastic ring being in contact with the inner peripheral face of said first cylindrical part and the outer peripheral face of said second cylindrical part, respectively.

8. A wiring apparatus of claim 1, wherein said flexible wiring member has a strip-shape.

* * * * *